United States Patent
Leggett et al.

(10) Patent No.: US 12,326,398 B2
(45) Date of Patent: Jun. 10, 2025

(54) TURBIDIMETER CLEANING

(71) Applicant: Hach Company, Loveland, CO (US)

(72) Inventors: Richard Edward Leggett, Dickinson, TX (US); Sebastiaan Cornelis Petrus de Heij, Dormagen (DE); Vadim B. Malkov, Fort Collins, CO (US)

(73) Assignee: Hach Company, Loveland, CO (US)

( * ) Notice: Subject to any disclaimer, the term of this patent is extended or adjusted under 35 U.S.C. 154(b) by 103 days.

(21) Appl. No.: 17/103,487

(22) Filed: Nov. 24, 2020

(65) Prior Publication Data

US 2021/0172861 A1    Jun. 10, 2021

Related U.S. Application Data

(60) Provisional application No. 62/941,055, filed on Nov. 27, 2019.

(51) Int. Cl.
| | |
|---|---|
| *G01N 21/15* | (2006.01) |
| *B08B 5/04* | (2006.01) |
| *B08B 9/00* | (2006.01) |
| *B08B 9/08* | (2006.01) |
| *G01N 21/11* | (2006.01) |

(52) U.S. Cl.
CPC ............ *G01N 21/15* (2013.01); *B08B 5/04* (2013.01); *B08B 9/00* (2013.01); *B08B 9/0808* (2013.01); *G01N 21/11* (2013.01); *B08B 2209/08* (2013.01); *G01N 2021/115* (2013.01); *G01N 2021/152* (2013.01)

(58) Field of Classification Search
CPC ....... G01N 2021/115; G01N 2021/152; G01N 21/05; G01N 21/11; G01N 21/15; B08B 2209/08; B08B 5/04; B08B 9/00; B08B 9/0808

USPC ..................................................... 134/166 R
See application file for complete search history.

(56) References Cited

U.S. PATENT DOCUMENTS

| | | | | |
|---|---|---|---|---|
| 4,165,179 A | * | 8/1979 | Sato | G01N 21/15 |
| | | | | 359/507 |
| 4,245,914 A | * | 1/1981 | Clack | G01N 21/15 |
| | | | | 359/507 |

(Continued)

FOREIGN PATENT DOCUMENTS

| | | |
|---|---|---|
| EP | 0073501 A1 | 3/1983 |
| JP | 2006153738 | 6/2006 |
| WO | 2015043675 A1 | 4/2015 |

OTHER PUBLICATIONS

International Searching Authority, Notification of Transmittal of the International Search Report and the Written Opinion of the International Searching Authority, or the Declaration, date of mailing Mar. 15, 2021, pp. 14.

*Primary Examiner* — Michael E Barr
*Assistant Examiner* — Thomas Bucci
(74) *Attorney, Agent, or Firm* — FERENCE & ASSOCIATES LLC

(57) ABSTRACT

An embodiment provides a method for cleaning a sample cell of a turbidimeter, including: introducing an apparatus comprising a cleaning component into the sample cell, wherein upon introduction of the apparatus into the sample cell a secondary flow path out of the sample cell is opened; engaging a functionality of the apparatus to clean the sample cell; and removing a plurality of particles from the sample cell via the secondary flow path. Other aspects are described and claimed.

10 Claims, 3 Drawing Sheets

(56) References Cited

U.S. PATENT DOCUMENTS

| | | | | |
|---|---|---|---|---|
| 4,872,353 A | * | 10/1989 | Orr, Jr. ................... | G01N 15/04 366/140 |
| 5,807,523 A | * | 9/1998 | Watts ............... | G01N 35/00594 366/168.1 |
| 5,976,470 A | * | 11/1999 | Maiefski .............. | B01J 19/0046 422/65 |
| 2013/0122596 A1 | * | 5/2013 | Kamihara .............. | G16C 20/10 702/32 |
| 2020/0056989 A1 | * | 2/2020 | Simon ....................... | C02F 1/20 |

* cited by examiner

TURBIDIMETER CLEANING

CROSS REFERENCE TO RELATED APPLICATION

This application claims priority to U.S. Provisional Patent Application Ser. No. 62/941,055, filed on Nov. 27, 2019, and entitled "TURBIDIMETER CLEANING," the contents of which are incorporated by reference herein.

FIELD

This application relates generally to the field of turbidimeters, and, more particularly, to cleaning a chamber of a turbidimeter.

BACKGROUND

A turbidimeter measures the turbidity of a liquid sample in a sample cuvette or vial. A nephelometric turbidimeter determines the concentration of solid particles suspended in a liquid sample within a sample cuvette by projecting a light beam into the liquid sample within the cuvette. A light detector detects the amount of light scattered by the suspended solid particles in a cone of solid angle, e.g., of 30° centered at 90° to the light beam axis. The scattering of the light can then be used to identify the turbidity of the sample.

If the light detector of a turbidimeter detects light scattered in one single sector of the circumference of the cuvette, vial, sample vessel, or the like, the signal of the light detector is relatively low because much scattered light is being thrown away. Circular mirrors and/or prism arrangements have been designed to coaxially surround the liquid sample cuvette in an effort to direct radially scattered light over the complete circumference to the light detector. Such designs generally are found to increase the signal to noise ratio (SNR).

BRIEF SUMMARY

In summary, one embodiment provides a method for cleaning a sample cell of a turbidimeter, comprising: introducing an apparatus comprising a cleaning component into the sample cell, wherein upon introduction of the apparatus into the sample cell a secondary flow path out of the sample cell is opened; engaging a functionality of the apparatus to clean the sample cell; and removing a plurality of particles from the sample cell via the secondary flow path.

Another embodiment provides a cleaning device for cleaning a sample cell of a turbidimeter, comprising: an apparatus having a cleaning component; a processor; and a memory storing instructions executable by the processor to: introduce the apparatus into the sample cell, wherein upon introduction of the apparatus into the sample cell a secondary flow path out of the sample cell is opened; engage a functionality of the apparatus to clean the sample cell; and remove a plurality of particles from the sample cell via the secondary flow path.

A further embodiment provides a cleaning device for cleaning a sample cell of a turbidimeter, comprising: a processor; and a memory storing instructions executable by the processor to: introduce an apparatus comprising a cleaning component into the sample cell, wherein the apparatus cleans the inner surface of the sample cell and wherein upon introduction of the apparatus into the sample cell a secondary flow path out of the sample cell is opened; engage a functionality of the apparatus to clean the sample cell, wherein the functionality is selected from the group consisting of: at least one wiper and at least one brush; and remove a plurality of particles from the sample cell via the secondary flow path utilizing a suction tube.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1A:
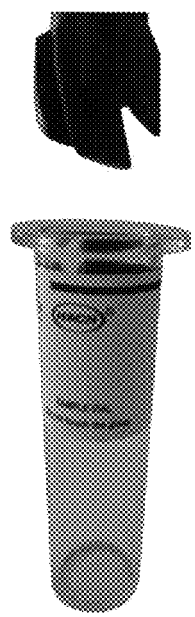
FIG. 1A illustrates an example embodiment of a sample cell prior to introduction of a cleaning assembly.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional methods and systems for measuring turbidity using a turbidimeter includes the turbidimeter utilizing a light source to generate a light beam, which may be a beam of a given wavelength. A sample of fluid may be placed in a sample cell for turbidity measurement. The measurement beam may be axially directed into a sample cell. The sample cell may have a window to allow the passage of light through the sample cell so that the light beam of the turbidimeter can infiltrate the sample cell. Alternatively, an incident light beam may be projected into the sample cell from a light source above the level of the sample in the cell at an angle of typically 45 degrees to the surface, and the scattered light collected at approximately 90 degrees to the incident beam. The window may be on a bottom portion of the sample cell. The turbidimeter may also collect scattered light caused by the light hitting particles in the sample fluid. The scattering may occur at substantially right angles. Thus, as the turbidimeter directs a light beam into the sample cell via the window, the turbidimeter may detect the light scattered by particulates in the sample cell. Thus, the scattered light may be utilized to provide a measurement of suspended particles in the sample fluid.

The sample vial may be a can or cylinder shaped vessel. The sample vial is typically transparent such that light from a light source may enter and scattered light may escape the sample cell. One limitation of conventional turbidimeters may be the residue or buildup of particulate matter in a sample vial. Turbidimeters, by design, are for a purpose of measuring suspended solids or particulate in a liquid sample. Thus, the introduction of fluids with particulate may introduce particulate in a sample cell, thereby fouling the turbidimeter. Turbidimeters may be automated, perform multiple cycles, or the like. Turbidimeters may experience a buildup of particulate matter in a sample cell thereby causing inaccurate measurements.

Not properly cleaning a sample cell may lead to many problems. For example, a build-up of particulate matter may provide erroneous turbidity measurement. Excess particulate may become suspended in future liquid samples leading to higher and inaccurate turbidity results. Alternatively or additionally, the particulate build up may stick to an inner surface of the sample cell. A buildup on the inside or outside of a sample cell may obstruct light passing into or out of the sample cell. Since the turbidity of a sample is correlated to the number and size of particulate in a sample, leftover particulate from a past sample may affect further turbidity measurements.

Retained or accumulated particulates are a major problem for accurate turbidimeter measurements. Particulate matter may be sand, iron, debris, fouling from organic growth, chemistry-based interferences, or the like. Certain conditions may allow particulate matter to remain in a sample cell. For example, if a flow rate is low, the particulates may remain in the sample cell. As another example, heavy particulates may accumulate in a sample cell. Particles may remain and block the entry light beam and/or scattered light. Residual particulate may lead to persistent inaccurate turbidity readings. Even if a system has a flushing mechanism, the buildup of particulate may overwhelm the system and/or cause a blockage of system components such as a back-pressure valve. What is needed is a system and method to remove particulate from a sample cell of a turbidimeter without modifying the turbidity of an incoming sample.

Accordingly, an embodiment provides a system and method for cleaning a sample cell of a turbidimeter. In an embodiment, a cleaning device may include an assembly having one or more cleaning components, for example, one or more wipers, one or more brushes, or the like. The assembly may be referred to as an Automatic Cleaning Module (ACM). The assembly may have a tube providing either suction or high-pressure rinse. The assembly may have a parked position. Moving from the parked position the assembly may enter a portion of the sample cell. As the assembly moves from the parked position, an additional flow channel is opened from the bottom tip of a brush or wiper. The additional flow may be a high-pressure wash or a high-vacuum drain. A single tube may provide either a high-pressure wash or a high-vacuum drain depending on a selected mode of the tube. The additional flow may be referred to as a secondary flow path. The assembly may place the additional flow near the bottom of the sample cell. The assembly may mechanically dislodge and/or suction particulate matter from the sample cell. The assembly may clean the interior surfaces of the sample cell. The cleaning may be of any inner surface such as, but not limited to, areas in which light enters or scatters and exits the sample cell. The assembly may be controlled by a system that detects particulate buildup and engages the assembly to clean a sample cell. In an embodiment, a component may include a liquid chemical, for example, oxalic acid. Alternatively or additionally, the system may engage the assembly after each turbidity reading or at periodic intervals as programmed by a user or as controlled by a system.

The illustrated example embodiments will be best understood by reference to the figures. The following description is intended only by way of example, and simply illustrates certain example embodiments.

Referring to FIG. 1, an example method and system for cleaning a sample cell is illustrated where the assembly is in a parked position. In an embodiment, the assembly may be moved from the parked position and lowered in a sample cell. The assembly may include cleaning components, for example, brushes, wipers, suction tubes, or a combination thereof to clean a sample cell. The assembly may be removed to perform turbidity measurements. Cleaning of the sample cell may be performed as necessary as determined by the system or user. The cleaning may be performed at predetermined intervals, constantly between turbidity measurements, or the like.

Referring to FIG. 1A, the assembly is shown in a parked position. The assembly may be referred to as an Automatic Cleaning Module (ACM). The parked position may a position in which the assembly is not within or inserted into a sample cell. The assembly may be moved to or from a parked position using a movement device such as a piston, cylinder, track, or the like. The assembly may be mounted upon an arm. The arm may be a robotic arm. The arm may allow movement of an assembly amongst different sample cells. The movement of the assembly may be automated by the system. For example, if the system determines that a sample cell has particulate buildup in a sample cell, the assembly may be moved into a sample cell.

In an embodiment, the assembly may have cleaning components, for example, wipers and/or brushes. The wipers and/or brushes may be affixed to the assembly such that the wipers and/or brushes may contact the inner surface of a sample cell when the assembly is moved into a sample cell. In an embodiment, the wipers and/or brushes may be on a spring or tensioner that keeps the wiper and/or brushes against the inner surface of a sample cell.

The assembly may have a similar outer diameter to the inner diameter of a sample cell. In an embodiment, the assembly may have an outer diameter larger than the inner diameter of a sample cell such that brushes and/or wipers fit tightly against the inner surface of a sample cell. The wipers and/or brushes may be flexibly mounted to allow insertion in a sample cell while keeping contact with an inner diameter of a sample cell. The wiper/brush may be attached to a longitudinal portion of the assembly and extend radially outward. Extending radially outward may allow the wiper/brush to contact an inner surface of the sample cell.

Figure 1B:
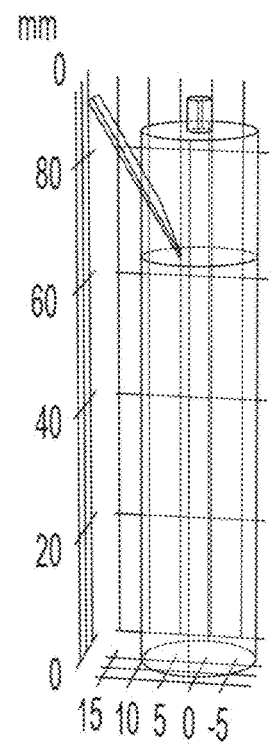
FIG. 1B illustrates another example embodiment of a sample cell prior to introduction of a cleaning assembly.
Figure 1C:
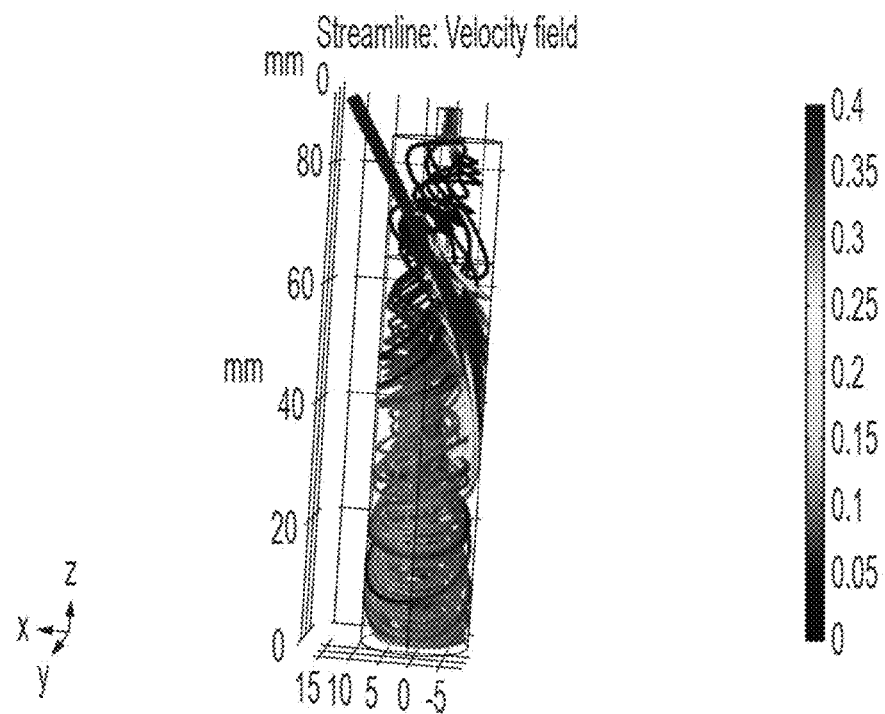
FIG. 1C illustrates flow in an example embodiment of a cleaning assembly.

Referring to FIG. 1B, a sample cell with one tube is shown. As demonstrated in FIG. 1C, a flow diagram of the movement of the sample liquid in the sample cell is illustrated. The flow diagram illustrates that there is very low flow in the bottom of the cylinder. The low flow in the bottom of the sample vial allows particulate that may have settled to remain in a sample vial. In other words, the flow to remove a sample and also remove associated particulate in the sample is not sufficient to remove particulate from the bottom of the sample vial. The particulate may continue to fall to the bottom of the sample vial. If the particulate remains, the particulate may interfere with the light path of the turbidimeter and/or contribute to erroneously high turbidity of future measurements in the sample cell.

Referring to FIG. 2, an example method and system for cleaning a sample cell is illustrated in an operative position. As described above, an assembly may be lowered or introduced into at least a portion of the sample cell, thereby being in an operative position. Referring to FIG. 2A, the assembly is shown lowered to the bottom or at least near the bottom of the sample cell in the operative position. The assembly may be lowered into position automatically in response to system parameters, periodically over time or by number of measurement cycles, on demand by a user, or the like.

The wipers and/or brushes may contact the inner surface of a sample cell. The assembly may have a movement to facilitate the clean of the inner surface of a sample cell. For example, the assembly may rotate, move in and out of the sample cell, or the like. The movement of the assembly may move the wipers and/or brushes across an inner surface of a sample cell. The wipers and/or brushes may clean the inner surface in its entirety or just a portion of the inner surface. A portion of the inner may include the light entrance window, the area from which light scatters and exits, or the like.

The wipers may be made of a rubber or silicone type material. The brush material may be a nylon or similar material. Wiper and/or brush material may be selected based upon ability to remain rigid enough to clean an inner surface, not disintegrate, compatibility with a sample fluid being test or the like. Wipers and/or brushes may be replaceable on an assembly. Alternatively, the assembly may be replaced at specific intervals.

Figure 2A:
FIG. 2A illustrates an example embodiment of a sample cell after introduction of a cleaning assembly.
Figure 2B:
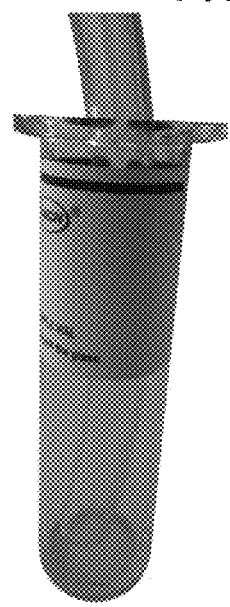
FIG. 2B illustrates another example embodiment of a sample cell after introduction of a cleaning assembly.

Referring to FIG. 2B, an example method and system for a suction tube is illustrated. The tube may be a separate piece extending through the center of the assembly or the tube may be molded as a single unit within the assembly. The suction tube adds an alternate preferential fluid exit flow channel via the assembly. The suction tube may lead to an atmospheric discharge point, drain, or the like. The suction tube may be lowered into an area of the sample cell more likely to contain particulate. The area more likely to contain particulate may be the bottom of the sample cell. Thus, the suction tube provides an accessible path for particles to be removed to a drain. This may facilitate the cleaning of the sample cell.

The increase of flow from a suction tube may remove particles in a sample cell, increase normal flow of a cell during operation, and may be plumbed to bypass or shunt the back-pressure regulator valve providing a preferential exit flow path to the sample cell. The vacuuming force of the flow and/or the placement of the suction tube near the particulate enables cleaning of the sample cell. The diameter of the suction tube may be selected based upon application.

For example, in a system in which a back-pressure regulator valve is not used, a smaller diameter suction tube may be necessary. The suction tube may be turned "on" of "off" using valves, electronic actuators, or the like, controlled by the system.

Figure 2C:
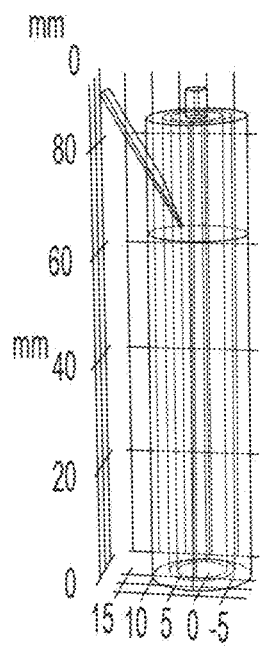
FIG. 2C illustrates a further example embodiment of a sample cell after introduction of a cleaning assembly.
Figure 2D:
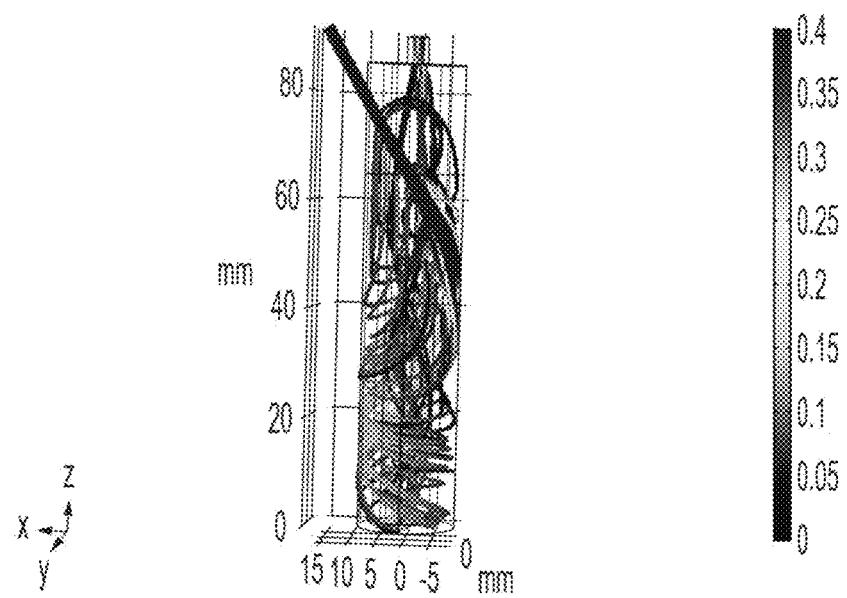
FIG. 2D illustrates flow in an example embodiment of a cleaning assembly.

Referring to FIG. 2C, a sample cell with one tube and the additional suction tube is shown. As demonstrated in FIG. 2B, a flow diagram of the movement of the sample liquid in the sample cell is illustrated. The flow diagram illustrates that there an increased flow in the bottom of the cylinder. The bottom of the sample cell may contain more particulate as compared to the rest of the sample cell. The combination of the wiping and/or brushing of the assembly along with the suction tube allows more flow and better removal of the particulate. Proper cleaning of the surfaces and/or the interior may increase the accuracy of the turbidimeter.

The system and method may determine the proper speed, rate of suction, speed of movement of the assembly, frequency of cleaning, or the like, in order optimize the removal of the particulate in a sample cell. The system may have flow sensors, fluid level sensors, light sensors, or any sensor to identify a build-up of particulate in a sample cell, which may then trigger the cleaning cycle. Additionally or alternatively, the assembly or ACM may be calibrated and programmed to clean a sample cell upon receiving a trigger event. For example, the system may be programmed that given certain parameters, such as a comparison of emitted to detected light, clarity of the sample, suction, number of cycles of measurement of turbidity, or the like, a cleaning cycle is triggered. The data from the sensor may be fed to the system to determine if a cleaning of the sample cell is required. The system may also monitor a plurality of turbidimeters in one or more locations. The system may collect data such as number of cycles an assembly has been used for cleaning. Such information may make recommendations on the need to change wipers, brushes, tubing, entire assemblies, or the like.

Cleaning of a sample cell may be at periodic intervals set by the user or preprogrammed frequencies in the device. Information related to a cleaning event (e.g., timing, last cleaning cycle, next cleaning cycle, frequency of cleaning cycles, measurement results before and after a cleaning, etc.) may be output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of a cleaning event, a need for cleaning, a need for servicing the assembly, or the like. An embodiment may use a system to shut down the assembly and associated cleaning during periods of unacceptable parameters, limits, or thresholds, for example, if an assembly is faulty, a sample fluid is too caustic, an assembly can no longer function properly, or the like.

If the assembly is outside acceptable parameters, the system may take corrective action. For example, the system may provide an input to the assembly to increase wiping/brushing speed, clean for a longer duration, increase suction, or the like. In an embodiment, an assembly may service multiple turbidimeters. In an embodiment, with multiple turbidimeters a neighboring assembly may move into a position to clean a sample cell. In an embodiment, the system may "change out" an assembly automatically, for example, replacing a current assembly with associated wipers/brushes with another assembly, in the case that an assembly is outside acceptable parameters.

Additionally or alternatively, the system may output an alarm, log an event, or the like. An alert may be in a form of audio, visual, data, storing the data to a memory device, sending the output through a connected or wireless system, printing the output or the like. The system may log information such as the assembly location, a corrective action, geographical location, time, date, number of measurement cycles, rate of flow, volume of fluid, a log of the type of fluid being delivered, or the like. The alert or log may be automated, meaning the system may automatically output whether a correction was required or not. The system may also have associated alarms, limits, or predetermined thresholds. For example, if cleaning of the sample cell reaches or falls below a threshold or limit. Alarms or logs may be analyzed in real-time, stored for later use, or any combination thereof.

The various embodiments described herein thus represent a technical improvement to conventional turbidimeters. Using the techniques as described herein, an embodiment may use a method and device to assist in the cleaning of a turbidimeter. This is in contrast to conventional methods with limitations mentioned above. Such techniques provide a better method and system to clean a turbidimeter.

Figure 3:
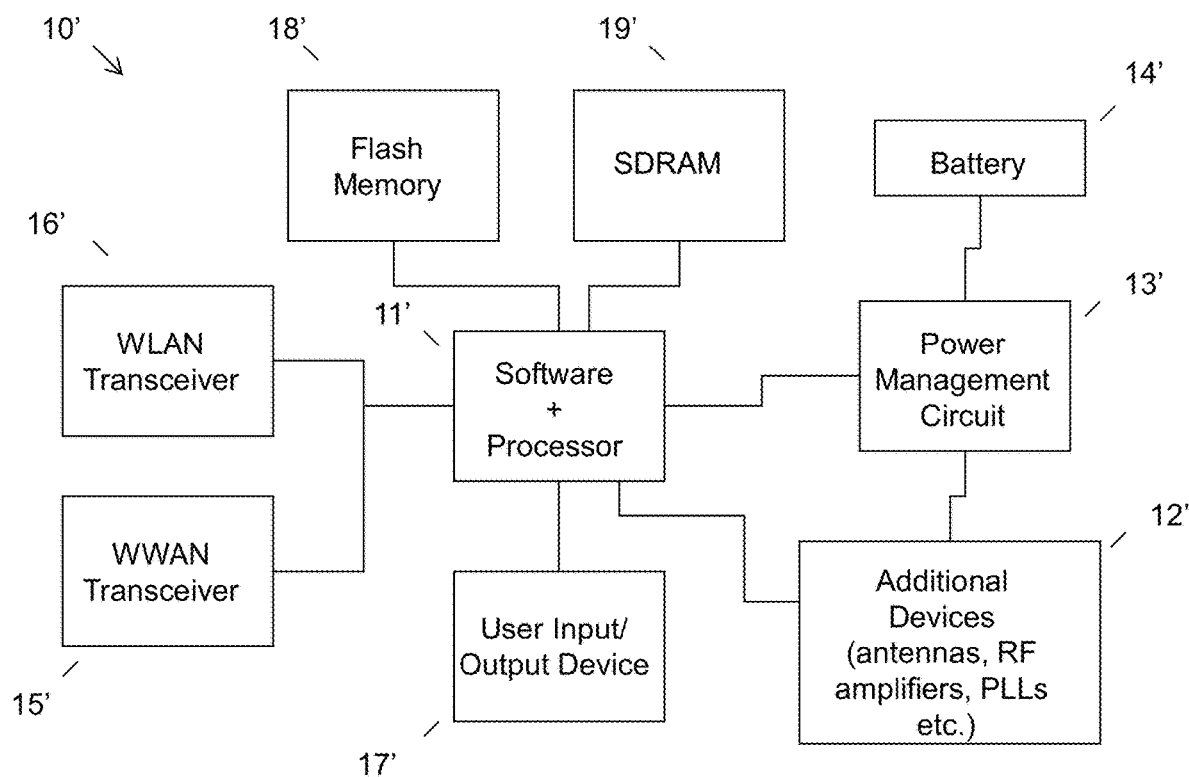
FIG. 3 illustrates an example of computer circuitry.

While various other circuits, circuitry or components may be utilized in information handling devices, with regard to a turbidimeter according to any one of the various embodiments described herein, an example is illustrated in FIG. 3. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of a turbidimeter.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A cleaning device for cleaning a sample cell of a turbidimeter, comprising:
   a sample cell cleaning assembly comprising a cleaning component and a tube extending from a bottom tip of the cleaning assembly to a location outside the sample cell, wherein at least a portion of the cleaning component contacts an inner diameter along a longitudinal length of the sample cell;
   a movement device;
   a processor operatively coupled to the sample cell cleaning assembly and the movement device; and
   a memory storing instructions executable by the processor to:
   move, using the movement device, the assembly into the sample cell, wherein upon introduction of the assembly into the sample cell the tube is opened on the assembly, thereby providing a secondary flow path from within the sample cell to a location outside the sample cell;
   engage, by moving the cleaning component using the movement device to move the assembly, a cleaning functionality of the assembly, once introduced into the sample cell and the cleaning component contacting the inner diameter of the sample cell, to clean the sample cell; and
   remove, using the tube, a plurality of particles from the sample cell via the secondary flow path, wherein the plurality of particles comprises residual particulate of a prior sample.

2. The device of claim 1, wherein the moving comprises movement of the assembly from a parked position to a position within the sample cell.

3. The device of claim 1, wherein the cleaning component comprises a brush.

4. The device of claim 1, wherein the cleaning component comprises a wiper.

5. The device of claim 1, wherein the tube comprises a tube selected from the group consisting of: a suction tube and a high-pressure rinse tube.

6. The device of claim 1, wherein the engaging comprises brushing, using a brush, an inside surface of the sample cell.

7. The device of claim 1, wherein the engaging comprises wiping, using a wiper, an inside surface of the sample cell.

8. The device of claim 1, wherein the removing comprises suctioning, using the secondary flow path, the plurality of particles of the sample cell through the secondary flow path.

9. The device of claim 1, wherein the assembly further comprises a valve and wherein the tube and the valve creates a high-pressure wash within the sample cell.

10. A cleaning device for cleaning a sample cell of a turbidimeter, comprising:
    a sample cell cleaning assembly comprising a cleaning component and a tube extending from a bottom tip of the cleaning assembly to a location outside the sample cell, wherein at least a portion of the cleaning component contacts an inner diameter along a longitudinal length of the sample cell;
    a movement device;
    a processor operatively coupled to the sample cell cleaning assembly and the movement device; and
    a memory storing instructions executable by the processor to:
    move, using the movement device, the assembly comprising a cleaning component into the sample cell, wherein the assembly cleans the inner surface of the sample cell and wherein upon introduction of the assembly into the sample cell the tube is opened on the assembly, thereby providing a secondary flow path from within the sample cell to a location outside the sample cell;
    engage, by moving the cleaning component using the movement device to move the assembly, a cleaning functionality of the assembly, once introduced into the sample cell the cleaning component and contacting the inner diameter of the sample cell, to clean the sample cell, wherein the cleaning functionality is selected from the group consisting of: at least one wiper and at least one brush; and
    remove, using the tube, a plurality of particles from the sample cell via the secondary flow path utilizing a suction tube, wherein the plurality of particles comprises residual particulate of a prior sample.

* * * * *